(12) United States Patent
Frey

(10) Patent No.: US 7,557,468 B2
(45) Date of Patent: Jul. 7, 2009

(54) PANEL AND BREAKER FOR DISTRIBUTING UPS POWER

(75) Inventor: Wilfred Frey, Kelowna (CA)

(73) Assignee: Always "On" UPS Systems Inc., Kelowna (CA)

( * ) Notice: Subject to any disclaimer, the term of this patent is extended or adjusted under 35 U.S.C. 154(b) by 105 days.

(21) Appl. No.: 11/347,248

(22) Filed: Feb. 6, 2006

(65) Prior Publication Data

US 2006/0197383 A1     Sep. 7, 2006

(51) Int. Cl.
*H01H 47/00* (2006.01)
(52) U.S. Cl. ..................................................... 307/130
(58) Field of Classification Search .................. 307/130, 307/116, 129, 115, 87; 361/62, 63
See application file for complete search history.

(56) References Cited

U.S. PATENT DOCUMENTS

| | | | | | |
|---|---|---|---|---|---|
| 4,243,855 | A | * | 1/1981 | Gratzmuller | ............... 200/81.4 |
| 4,876,624 | A | * | 10/1989 | Chow | ........................... 361/87 |
| 4,899,246 | A | * | 2/1990 | Tripodi | ......................... 361/44 |
| 5,539,651 | A | * | 7/1996 | Zabar et al. | .................... 702/60 |
| 5,627,712 | A | * | 5/1997 | Wilkinson | ..................... 361/63 |
| 6,688,303 | B2 | * | 2/2004 | Davenport et al. | ........... 126/570 |
| 6,952,149 | B2 | * | 10/2005 | Ciarcia et al. | .................. 335/16 |
| 2008/0130179 | A1 | * | 6/2008 | Gajic et al. | .................... 361/36 |

* cited by examiner

*Primary Examiner*—Albert W Paladini
*Assistant Examiner*—Calos Amaya
(74) *Attorney, Agent, or Firm*—Oyen Wiggs Green & Mutala LLP

(57) ABSTRACT

A UPS power distribution panel which includes means for detecting and differentiating between a symmetrical current waveform and a non-symmetrical current waveform and means for tripping and clearing a circuit breaker in the former but not the latter condition within one current waveform cycle.

7 Claims, 3 Drawing Sheets

PANEL AND BREAKER FOR DISTRIBUTING UPS POWER

FIELD OF THE INVENTION

This invention relates to the field of circuit breaker panels and in particular to a panel to distribute UPS power and to provide protection against branch overloads or short circuits from opening output breakers of the UPS or creating power loss to all branches or circuits.

BACKGROUND OF THE INVENTION

Typically large uninterrupted power supply (UPS) installations involve locating the backup system in a central area and distributing the power, through standard breaker panels and branch circuits, to many power supplies in separate areas of the facility. This type of system is generally not of concern until one of the branch circuits experiences an overload or short circuit condition which affects some or all of the other loads which are connected to the output of the same UPS. Standard panels, at the time of a short circuit, drop to a zero (0) voltage level resulting in all loads connected to the panel experiencing a loss of power causing re-boots, opened contacts, etc. During the duration of the short circuit the output voltage of the UPS drops to zero until that particular branch circuit breaker trips, removing the faulty equipment from the system.

The length of time required to clear the breaker has a major effect on the rest of the system, due to the limited ride-through capabilities of a typical power supply. Most equipment will be affected should the power be interrupted for a period greater than 1 cycle at rates frequency. It then becomes important that the short circuit fault duration does not exceed this specification.

SUMMARY OF THE INVENTION

The panel according to the present invention is designed to connect a multitude of critical loads to one panel. The panel incorporates a system breaker and communication interface. The system breaker protects the critical loads connected from reacting to power surges, spikes and other power anomalies such as shorts and overloads. The panel is designed to distribute UPS supplied power to individual branch circuits. The panel may handle from 1 to 96 breakers, 0 to 600V AC or DC using 1 or 3 pole breakers. The breaker, which is used to isolate respective branch circuits within the distribution panel for a UPS system, must be designed to trip and clear a fault condition or short circuit within the time period allotted, in order to prevent other loads on the same panel from being affected by the same fault. The breaker must also be able to differentiate between normal inrush currents of a load, and a short circuit. The breaker must also be able to trip within 1 cycle utilizing the limited short circuit current available at the UPS output. The trip characteristics of the breaker must be repeatable and within tolerance of the specification for all instances.

In summary then, the present invention is a UPS power distribution panel which includes means for detecting and differentiating between a symmetrical current waveform and a non-symmetrical current waveform and means for opening, that is, tripping and clearing a circuit breaker in the former but not the latter condition within one current waveform cycle.

DETAILED DESCRIPTION OF BREAKER AND OPERATION

Figure 1:
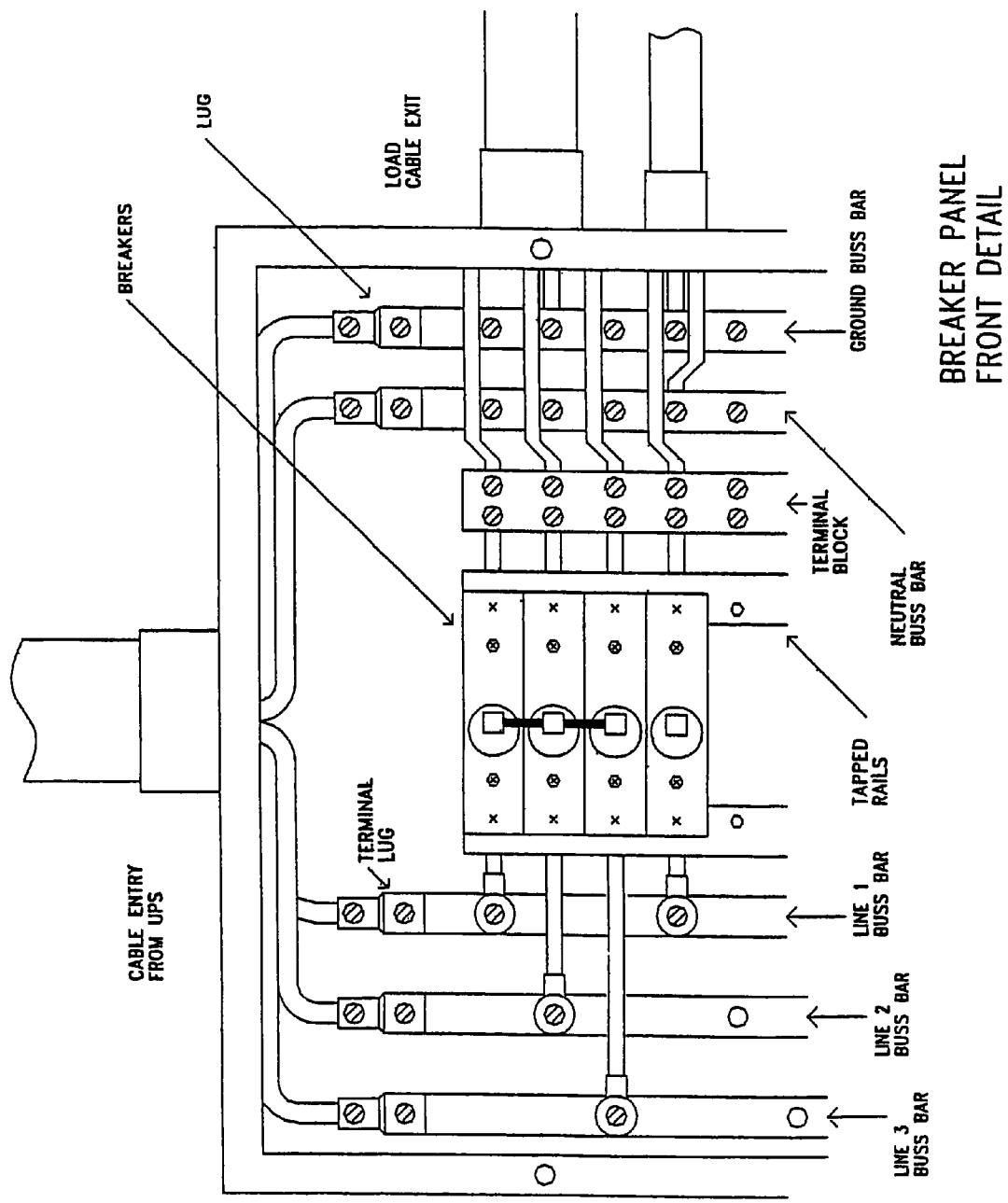
FIG. 1 is a partially cut away front elevation view of a breaker panel according to one embodiment of the present invention.
Figure 2:
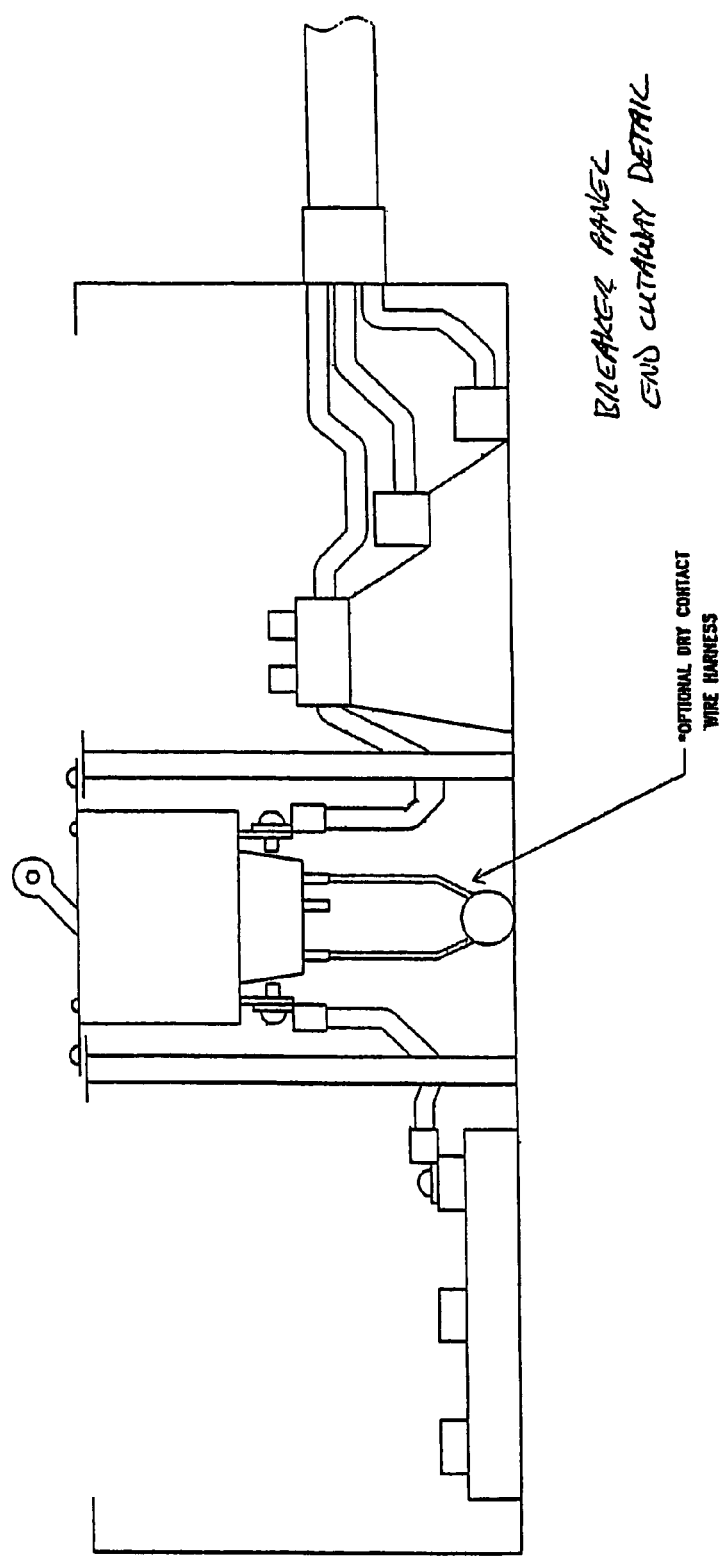
FIG. 2 is a partially cut away end elevation view of the breaker of FIG. 1.
Figure 3:
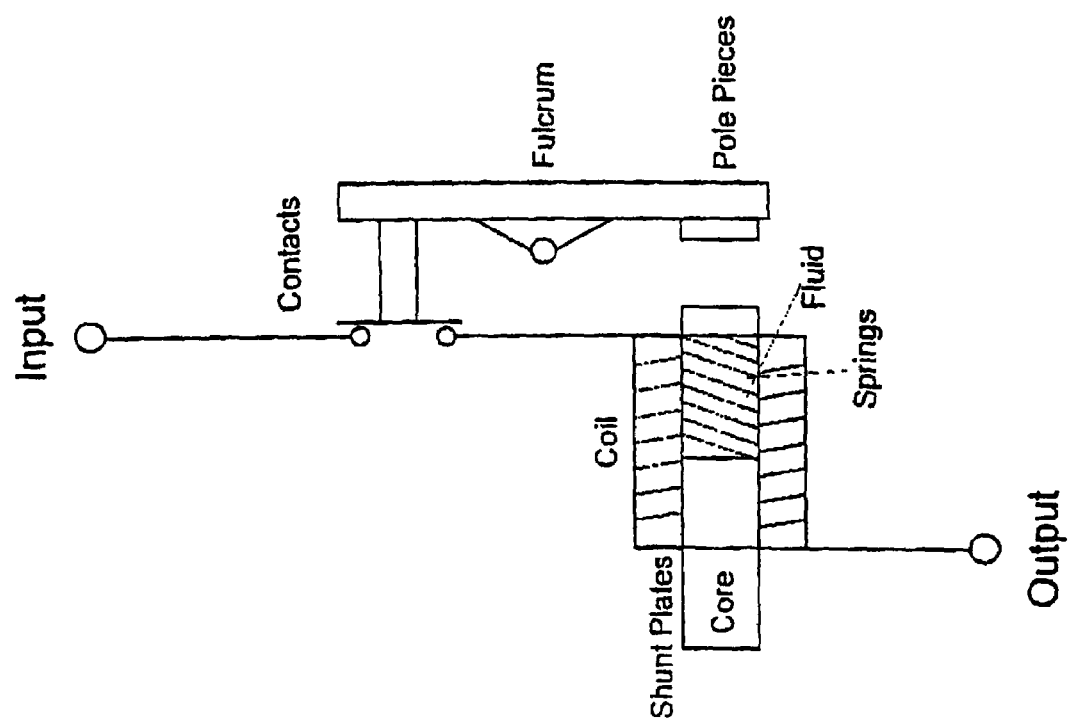
FIG. 3 is a diagrammatic view of a breaker according to another embodiment of the present invention.

If a short circuit exists for a time period equal to or greater than 1 cycle, it may be assumed that typical power supplies have been affected, as their "ride through" is generally shorter than this time period. It then becomes very important that the short circuit duration does not exceed this specification.

IEC dictates the maximum allowable duration for the interruption of power, while still meeting IEC 62040-3 Class 1 standards, as being within 1 cycle for complete transient voltage recovery. ITIC (CBEMA) dictate the same value.

The UPS remains in INVERTER mode to deliver a controlled amount of output current during the short circuit, eliminating transients generated from saturated transformers while the fault is cleared.

The panel of the present invention protects the critical loads from reacting to a short circuit or overload condition by clearing the system breaker within one cycle preventing the other loads connected to the panel from seeing or reacting to this loss of power. The design of the system breaker allows distinguishing between normal inrush of equipment and a short circuit or overload condition.

If the system detects a symmetrical current waveform (both halves of the sine wave have equal current flow exceeding threshold), this is equated to a short circuit condition, then the breaker will trip. If the system detects a non-symmetrical current waveform (first half of sine wave exceeds threshold, second half does not exceed threshold), this is equated to a normal inrush of load, and the breaker will not trip.

The system breaker is a magnetic/hydraulic symmetric breaker. The incoming current energizes a coil creating the magnetic field which in turn pulls the piston closer to the contact. The symmetry aspect comes into play with the second pulse.

If the second pulse exceeds the threshold of the breaker and is within a 2:1 ratio of the initial pulse, the increase in the magnetic field will cause the piston to connect with the contact tripping the breaker. This condition implies a short circuit or overload.

If the second pulse exceeds the threshold of the breaker, but has dropped significantly from the original pulse (i.e., the ratio of the first pulse to the second pulse is approximately 3:1 or greater) the magnetic field will be small enough not to move the piston leaving the contacts open. The condition occurs during inrush of equipment.

A micro switch per branch may be provided in an alternative embodiment. This switch will allow for power isolation of the individual branch from the power bus, making removal of the breaker safer.

The present invention is thus pulse tolerant, thereby eliminating false tripping due to the normal inrush that occurs when switching power supplies.

As will be apparent to those skilled in the art in the light of the foregoing disclosure, many alterations and modifications are possible in the practice of this invention without departing from the spirit or scope thereof.

What is claimed is:

1. A panel to distribute power from a power supply to at least one load, the panel comprising:
   at least one breaker, and
   means for detecting a current waveform in a power line through which power is distributed by the panel to the load,
   wherein the means for detecting the current waveform is configured to close the breaker upon detecting a non-symmetrical current waveform,
   wherein the means for detecting the current waveform is configured to open the breaker upon detecting a symmetrical current waveform within one cycle of the detected symmetrical current waveform,
   wherein the breaker comprises an input connected to receive electrical current comprising a first pulse and a second pulse and an output connected to provide the received electrical current to the load when the breaker is closed, and wherein the means for detecting the current waveform comprises a coil connected between the input and the output of the breaker and configured to generate a magnetic field in response to the received current such that:
      the magnetic field generated by the coil opens the breaker within one cycle if a magnitude of the second pulse is greater than a threshold of the breaker and is at least one half of a magnitude of the first pulse, and
      the magnetic field generated by the breaker is insufficient to open the breaker if the magnitude of the second pulse is greater than the threshold and is at most one third of the magnitude of the first pulse.

2. A panel for distributing power from a power supply to at least one load, the panel comprising:
   at least one breaker comprising an input connected to receive electrical current comprising a first pulse and a second pulse and an output connected to provide the received electrical current to the load when the breaker is closed, the breaker having a coil connected between the input and the output of the breaker and configured to generate a magnetic field in response to the received current such that:
      the magnetic field generated by the coil opens the breaker within one cycle if a ratio of a magnitude of the first pulse to a magnitude of the second pulse is at most 2:1, and
      the magnetic field generated by the breaker is insufficient to open the breaker if the ratio is at least 3:1.

3. A panel according to claim 2 wherein the power is supplied by an uninterruptible power system.

4. A panel according to claim 2 wherein the number of breakers ranges from 1 to 96.

5. A panel according to claim 2 wherein the power ranges from 0 to 600 V AC.

6. A panel according to claim 2 wherein the power ranges from 0 to 600 V DC.

7. A panel according to claim 2 wherein the breaker is selected from the group consisting of a one pole breaker and a three pole breaker.

* * * * *